United States Patent  [15] 3,675,685
Potter  [45] July 11, 1972

[54] PIPE STOPPER FOR BELL AND SPIGOT TYPE OF TILE

[72] Inventor: Charles Potter, Lakewood, Ohio
[73] Assignee: Amvit, Cleveland, Ohio
[22] Filed: Sept. 8, 1970
[21] Appl. No.: 70,112

[52] U.S. Cl..............................138/89, 220/46, 285/231
[51] Int. Cl..................................................F16l 55/10
[58] Field of Search.................138/89; 277/207 B, 198; 285/231; 220/46 R

[56] References Cited

UNITED STATES PATENTS

| | | | |
|---|---|---|---|
| 2,281,145 | 4/1942 | Duey | 138/89 |
| 2,537,659 | 1/1951 | Eisner et al. | 220/46 X |
| 3,294,274 | 12/1966 | Spitzberg | 220/46 |
| 2,644,978 | 7/1953 | Becker | 138/89 X |
| 3,073,609 | 1/1963 | Hamilton | 277/207 B |
| 3,578,027 | 5/1971 | Zopli | 138/89 |

Primary Examiner—William E. Wayner
Attorney—John Harrow Leonard

[57] ABSTRACT

A pipe stopper is receivable in the bell of a bell and spigot pipe for plugging the bell passage. It is a molded plug of stiff set plastic having a cylindrical peripheral face which is spaced from its inner end and a peripheral seating face extending therefrom entirely to the inner end of the plug. An abrupt generally radially extending shoulder extends between the adjacent ends of the faces. The plug is free from any shoulders or surfaces facing toward, and aligned with, faces or shoulders facing toward the inner end. An elastomeric gasket having an inner face resiliently engaging the seating face in embracing relation is provided. It has a radial cross section such that it cannot roll about its circumferential axis and thus off of the end of seating face. The gasket fits in sealing relation to the seating face and the surrounding inner wall of the pipe bell in which the plug is installed. The main advantage is that the plug is of a shape that can be molded readily in a very simple mold, and yet, in combination with a proper gasket, seals effectively.

6 Claims, 6 Drawing Figures

PATENTED JUL 11 1972  3,675,685

INVENTOR.
Charles Potter,
BY
John H. Leonard
his ATTORNEY.

PIPE STOPPER FOR BELL AND SPIGOT TYPE OF TILE

This invention relates to pipe stoppers and particularly to pipe stoppers which are receivable in the bell of a bell and spigot type tile for plugging the bell passage.

In the laying of bell and spigot pipe lines, particularly vitrified bell and spigot sanitary sewer tile, each of a number of tiles along the line is provided with a lateral tap-in in the form of a lateral sleeve integral with, and generally of smaller diameter than, the pipe and terminating outwardly in a bell for receiving the spigot of the terminal pipe of a lateral pipe line. Since these tap-ins are for receiving the sanitary sewer lines from houses which will be built at some indefinite future date, whereas the main sewer line is installed a considerable period before the houses are built, it becomes necessary, pending the installation of lateral drains from the houses, to plug temporarily the bells of the lateral tap-ins. A number of types of stoppers for this purpose have been provided, one such being disclosed in U.S. Pat. No. 3,412,759, of Potter et al, issued Nov. 26, 1968. The present invention is a simplified type of stopper which in many cases may be used in lieu of the stopper of the above identified patent. It is one which can be made readily with a very simple mold and which depends for its effectiveness upon a combination therewith of an elastomeric gasket which effects a sealing relation between a peripheral wall portion of a stopper and inner wall of the tap-in bell, as defined in many cases by the true-up lining thereof, and which remains fixed in position on the stopper during installation and use.

The advantages of the present stopper over those heretofore provided is its extreme simplicity and ease of installation.

Various specific objects and advantages of the invention will become apparent from the following description wherein reference is made to the drawings, in which.

Figure 3:
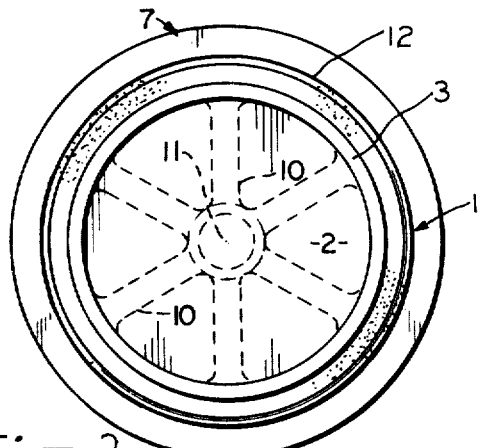
FIG. 3 is a left end elevation of the stopper illustrated in FIG. 1.
Figure 1:
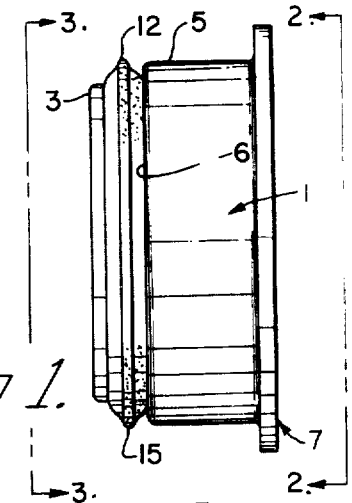
FIG. 1 is a side elevation of a stopper embodying the principles of the present invention.

Referring first to FIG. 1, the stopper comprises a unitary plug 1 of relatively stiff, hard molded material which may be any one of the conventional plastics which are resistant to ground water chemicals and sewage. The plug 1 comprises basically a relatively stiff central wall 2 which may have a peripheral bead portion 3 at its inner face and having an exterior peripheral seating wall 4 extending from its outer face partway toward the opposite or outer end of the plug. The wall 4 for the greater portion of its axial length is coextensive with the thickness of the wall 2 so as to be reinforced thereby against radial distortion. The plug also has a peripheral wall 5 extending outwardly endwise of the plug from the outer end of the wall 4. The wall 5 is of greater diameter than the seating wall 4 and the juncture between the two is in the form of an abrupt generally radially extending stop shoulder 6.

Figure 5:
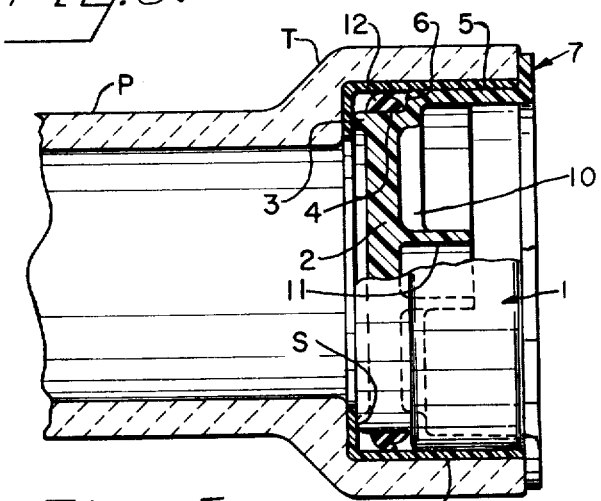
FIG. 5 is an enlarged fragmentary cross-sectional view of a portion of the pipe with the stopper of the present invention installed therein.
Figure 2:
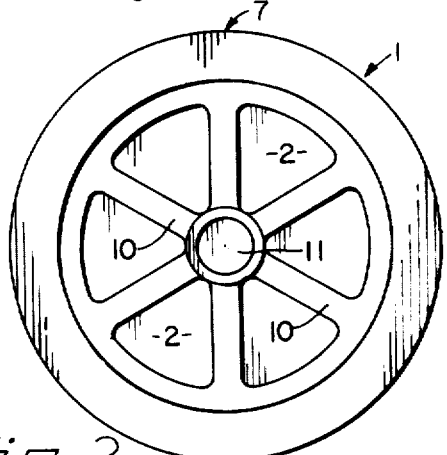
FIG. 2 is a right end elevation of the stopper illustrated in FIG. 1.

At its outer end the peripheral wall 5 is provided with an annular rim 7 which extends radially outwardly from the wall 5. The rim is relatively stiff, but resilient. When the plug is installed in the bell of a tap-in T, as illustrated in FIG. 5, of a pipe P, the rim 7 overlies the outer end wall of the bell, thus limiting the extent to which the stopper can be inserted and also providing a means to be grasped for removing the stopper from the bell when desired. In the form illustrated, the interior of the bell is shown as having a true-up lining L of plastic composition molded in situ and providing the inner peripheral wall and radial shoulder S of the bell.

The wall 2 is reinforced against radially inward collapse by a plurality of radial reinforcing webs 10 which preferably are about six in number spaced equidistantly about the axis of the wall 2. The webs 10 terminate axially at the outer end of the peripheral wall 5.

Near its center the wall 2 carries a thick wall socket 11 which is integral with the wall 2 and with the inner ends of the reinforcing webs 10.

Mounted on and in elastically embracing stressed relation to the seating wall 4 is an elastomeric gasket 12 which may be a gasket such as disclosed in U.S. Pat. No. 3,510,139, of Charles Potter, issued May 5, 1970. The advantages of this specific type of gasket and the manner in which it effectively seals are disclosed in the above patent. Here it is pointed out briefly that the gasket main body in radial cross section has an inner wall portion 13, which is lineal axially of the gasket, and an outwardly convex wall 14, which may be substantially hemispherical. At the radially outermost portion of the wall 14, which is midway between the ends of the gasket, a small peripheral bead 15 is provided. It is so related to the gasket main body that after the stopper is forced into the bell, the bead first provides a light sealing engagement with the bell wall and then, as the bell pressure increases due to further inward travel of the stopper, bends over and against the convex wall 14 so as to provide a greater sealing pressure when the stopper is finally installed.

Figure 6:
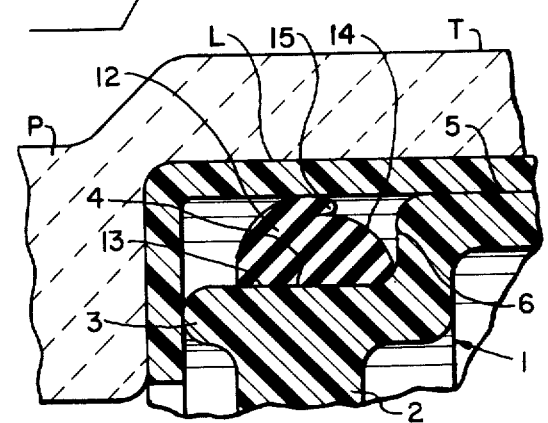
FIG. 6 is an enlarged fragmentary view of the structure illustrated in FIG. 5 showing in greater detail the cooperation of the gasket with its associated stopper and bell.

The wall 2 and peripheral wall 4 offer sufficient resistance so that the gasket can be flexed into tight sealing relation, as illustrated in FIG. 6, merely by pushing the stopper axially into the bell. The bead portion 3 of the end wall 2 permits some latitude in installation in event of small variation in the normal shape of the shoulder S so that it offers a firm seating relation against the shoulder S.

Figure 4:
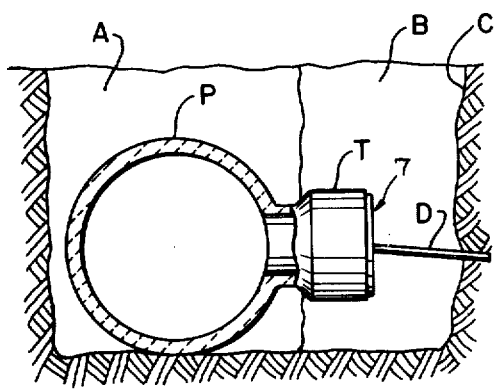
FIG. 4 is a diagrammatic illustration, partly in section, showing the stopper installed in a tap-in bell of a pipe.

As illustrated in FIG. 4, the main sanitary line, including the pipe P is installed in the main trench A. The lateral or tap-in T of one of the main pipes extends into a widened trench portion B such that the stopper is relatively close to the earth forming the wall C of the trench portion B. The stopper 1 is installed in the bell of the lateral tap-in T and blocked to hold the stopper in place and prevent its being forced out of the tile by hydraulic pressure within. For blocking a stiff member D, such as an ordinary stick, board or brick may be used. One end or corner of the member is seated in the socket 11 and the other end or side is forced into the earth so that the stopper is wedged or pressed tightly against the radial shoulder of the bell at the inner end of the bell.

When a lateral sanitary line is to be connected, the line may be laid to a location close to the bell. The stick, or other blocking member employed, and stopper are then removed, and the spigot of the terminal lateral drain tile is then installed in the bell.

It is to be noted that each of the side walls 4 and 5 is of uniform outside diameter for its full length and each is essentially cylindrical, except for a very slight radially inward taper toward the inner end of the plug which is provided for draft to facilitate removal of the stopper from the die. Due to the elimination of a seating groove in the wall 4, such as required for O-ring seals, the stopper can be molded as a unitary structure in a simple two piece mold.

Without such a groove, the gasket 12 retains its position on the wall 4 in endwise abutting relation to the shoulder 6 without rolling and twisting.

It is apparent that the present stopper can readily be installed by unskilled labor with assurance that it will maintain an effective seal.

Having thus described my invention, I claim:

1. A bell pipe stopper comprising:
    a one piece plug of relatively stiff and hard, but slightly flexible, molded plastic, said plug having a thick imperforate bottom wall and a peripheral seating face extending from the innermost end of the outer periphery of the bottom wall outwardly endwise of the plug at least to the outer end of said bottom wall;

said plug having a shoulder extending outwardly laterally from said face near the outer end of said bottom wall and facing toward the inner end of the plug;

said face being substantially cylindrical throughout its length;

said plug being free from any surface portions between its ends facing other aligned surfaces which face toward the inner end of the plug; and a detachable elastomeric gasket in resilient embracing relation to said face and abutting said shoulder and substantially coextensive axially with said bottom wall and having a substantially cylindrical inner face in tight resilient embracing relation to said seating face, and having an outwardly convex outer peripheral face with its outermost portion of larger diameter than the shoulder characterized in that the bottom wall of the plug has a peripheral annular end bead portion at its inner surface, said bead portion having a narrow inner end face offset, in a direction away from the outer end of the plug axially of the plug, from said inner surface of the bottom wall.

2. The structure according to claim 1 wherein the plug has at its outer end a radially outwardly, extending annular flange of larger diameter than said shoulder and spaced axially of the plug therefrom.

3. The structure according to claim 1 wherein the plug is installed in a ceramic pipe having a bell for receiving the spigot of a connected pipe;

the plug is received in said bell and blocks the passage thereinto;

said seating face is spaced inwardly from the inner peripheral wall of the bell; and the elastomeric gasket is in resilient embracing relation to said face and is also in stressed sealing engagement with the inner peripheral wall of the bell.

4. The structure according to claim 1 wherein the bottom wall, at its outer face, has at its midportion a brace receiving socket opening outwardly endwise of the plug.

5. The structure according to claim 4 wherein the plug has an outer peripheral wall portion between said shoulder and the outer end of the plug and reinforcing ribs are provided which extend from the outer peripheral wall of the socket to said outer peripheral wall portion of the plug.

6. The structure of claim 4 wherein said socket is relatively deep and is in the form of a peripheral side wall integral with the bottom wall and external from and beyond the outer face thereof toward the outer end of the plug and said plug further including reinforcing ribs integral with the plug and said peripheral wall so as to reinforce said peripheral wall against deflection transversely of the plug.

* * * * *